US005141204A

United States Patent [19]

Marosy

[11] Patent Number: 5,141,204

[45] Date of Patent: Aug. 25, 1992

[54] ROLLABLE/FOLDABLE SOFA JACK

[76] Inventor: Edward L. Marosy, 1596 Mitchell Ave., Tustin, Calif. 92680

[21] Appl. No.: 715,781

[22] Filed: Jun. 14, 1991

[51] Int. Cl.[5] .................... B60P 1/48

[52] U.S. Cl. .................... 254/8 R

[58] Field of Search .................... 254/120, 131, 129, 130, 254/8 R, 8 B

[56] References Cited

U.S. PATENT DOCUMENTS

| | | | |
|---|---|---|---|
| 2,859,012 | 11/1958 | Oleson et al. | 254/8 R |
| 2,910,271 | 10/1959 | Keehn | 254/129 |
| 3,157,411 | 11/1964 | Rhodes | 254/131 |
| 3,467,405 | 9/1969 | Fogg | 254/131 |
| 3,809,261 | 5/1974 | Lee | 254/8 R |
| 3,876,096 | 4/1975 | Latek | 254/8 R |

FOREIGN PATENT DOCUMENTS

| | | | |
|---|---|---|---|
| 2226005 | 6/1990 | United Kingdom | 254/131 |

*Primary Examiner*—Robert C. Watson
*Attorney, Agent, or Firm*—William L. Chapin

[57] ABSTRACT

A jack for elevating a sofa or similar article of furniture to facilitate cleaning the area beneath the article has an elongated, horizontal beam rollably supported at the rear end thereof by a pair of wheels, one on each end of a horizontal axle disposed perpendicularly to the longitudinal axis of the horizontal beam. An L-shaped plate attached to the front end of the horizontal beam has a lower horizontal plate extension adapted to be inserted under an article of furniture. The jack includes an upright beam member that is pivotably attached to a wheel axle. A stop member located rearward of the axle limits rearward movement of the upright member, such that under the force of gravity the longitudinal axis of the upright member extends obliquely upward and rearward from the horizontal beam. Downward pressure applied to a foot pedal pivotably attached to the upper end of the upright member transmits a torque through the stop member to the horizontal beam which is effective in elevating the front end of the horizontal beam and an article of furniture under which the L-shaped plate may be inserted. The upright member may be pivoted forward to place the jack in a more compact configuration for storing and transporting.

21 Claims, 2 Drawing Sheets

ROLLABLE/FOLDABLE SOFA JACK

BACKGROUND OF THE INVENTION

1. Field of the Invention

This invention relates to implements for lifting furniture. More particularly, the invention relates to a wheeled jack for lifting heavy articles of furniture, such as sofas, to permit cleaning the area underneath the article.

2. Description of Background Art

Thorough cleaning of rooms in individual residences, hotels, offices and the like often includes vacuum cleaning of the floors, especially if the rooms contain rugs.

Vacuum cleaning provides an effective means of removing dust, dirt, pollen and other foreign substances which are at the very least, unsightly, and which oftentimes pose a health hazard to occupants of the room.

If a room to be vacuum cleaned contains furniture, it is necessary to insert the vacuum cleaner head under the furniture, or move the furniture out of the way, to gain access to the floor beneath the article of furniture.

When a room to be vacuum cleaned contains one or more heavy articles of furniture, such as a sofa, gaining access to the floor beneath the article can be difficult. Access may be facilitated by providing wheels or coasters attached to the underside of the sofa frame. However, not all sofas or heavy furniture are equipped with wheels. Also, the layout of some rooms does not permit easy relocation of furniture during cleaning, even if the furniture were equipped with wheels. Additionally, movement of heavy furniture, whether or not equipped with wheels, is sometimes troublesome for smaller women and men. The present invention was conceived of to provide a device which may be used by a person, even of limited strength, to conveniently lift heavy furniture such as sofas, to facilitate cleaning the area underneath the furniture.

Prior art references which relate generally to the field of the present invention and which are known to the present inventor include the following U.S. patents:

Chenette, U.S. Pat. No. 2,274,918, Mar. 3, 1942, Lifting And Portable Moving Iron;

Blackwelder, U.S. Pat. No. 3,806,181, Apr. 23, 1974, Lifting Device;

Lee, U.S. Pat. No. 3,809,261, May 7, 1974, Moving System;

Schaefer, U.S. Pat. No. 3,871,054, Mar. 18, 1975, Dolly and Method of Using It To Hand A Door;

Herrmann, U.S. Pat. No. 3,985,338, Manhole Cover Lifter.

The present invention was conceived of to provide a wheeled furniture jack of improved design which is specifically adapted to provide ready access to areas underneath heavy articles of furniture, to facilitate cleaning those areas.

OBJECTS OF THE INVENTION

An object of the present invention is to provide a jack for lifting heavy articles of furniture, such as sofas.

Another object of the invention is to provide a furniture jack adapted to lifting one edge of the base of an article of furniture.

Another object of the invention is to provide a furniture jack which is operable by a single foot.

Another object of the invention is to provide a furniture jack which is operable by a pivotable foot plate which allows a foot operating the jack to remain relatively level throughout the entire lifting operation.

Another object of the invention is to provide a furniture jack which is foldable into a more compact structure when not in use.

Another object of the invention is to provide a furniture jack equipped with wheels to allow the jack to be rolled to and underneath an article of furniture to be lifted.

Various other objects and advantages of the present invention, and its most novel features, will become apparent to those skilled in the art by perusing the accompanying specifications, drawings and claims.

It is to be understood that although the invention disclosed herein is fully capable of achieving the objects and providing the advantages described, the characteristics of the invention described herein are merely illustrative of the preferred embodiment. Accordingly, I do not intend that the scope of my exclusive rights and privileges in the invention be limited to details of the embodiments described. I do intend that equivalents, adaptations and modifications of the invention reasonably inferable from the description contained herein be included within the scope of the invention as defined by the appended claims.

SUMMARY OF THE INVENTION

Briefly stated, the present invention comprehends a jack for lifting heavy articles of furniture, such as sofas. The intended purpose of the furniture jack according to the present invention is to provide means for conveniently lifting an edge of the base of a heavy article of furniture such as a sofa, thereby affording access to the area of the floor beneath the article and allowing cleaning of that area by use of a vacuum cleaner or other means.

The furniture jack according to the present invention includes an elongated straight horizontal beam rollably supported at its rear end by a pair of wheels located adjacent opposite vertical side walls of the beam and attached to opposite ends of a horizontal axle disposed perpendicularly through the vertical side walls of the beam. A flange having in side elevation view the shape of an L is attached to the front end of the horizontal beam, the lower plate portion of which extends forward and is adapted to be inserted under an edge of a sofa or other article of furniture.

An upright member comprising an elongated straight beam is pivotably fastened to the rear portion of the horizontal beam in a manner permitting the upright member to pivot forward in a vertical plane towards the front end of the horizontal member, when it is desired to store or transport the jack. To use the jack, the upright member is pivoted rearwards into contact with a stop member which protrudes perpendicularly upwards from the horizontal member, rearward of pivot means joining the upright member to the horizontal member. A pedal is pivotably attached to the upper end of the upright member. Downward pressure applied to the upper surface of the pedal by foot of a user causes the front L-shaped flange member to pivot upwards around a pivot axis coincident with the wheel axle, thereby lifting the edge of the sofa.

DETAILED DESCRIPTION OF THE INVENTION

Referring now to FIGS. 1 through 5, an implement for lifting furniture according to the present invention, referred to herein as a sofa jack, is shown.

Figures 1, 2, 3:
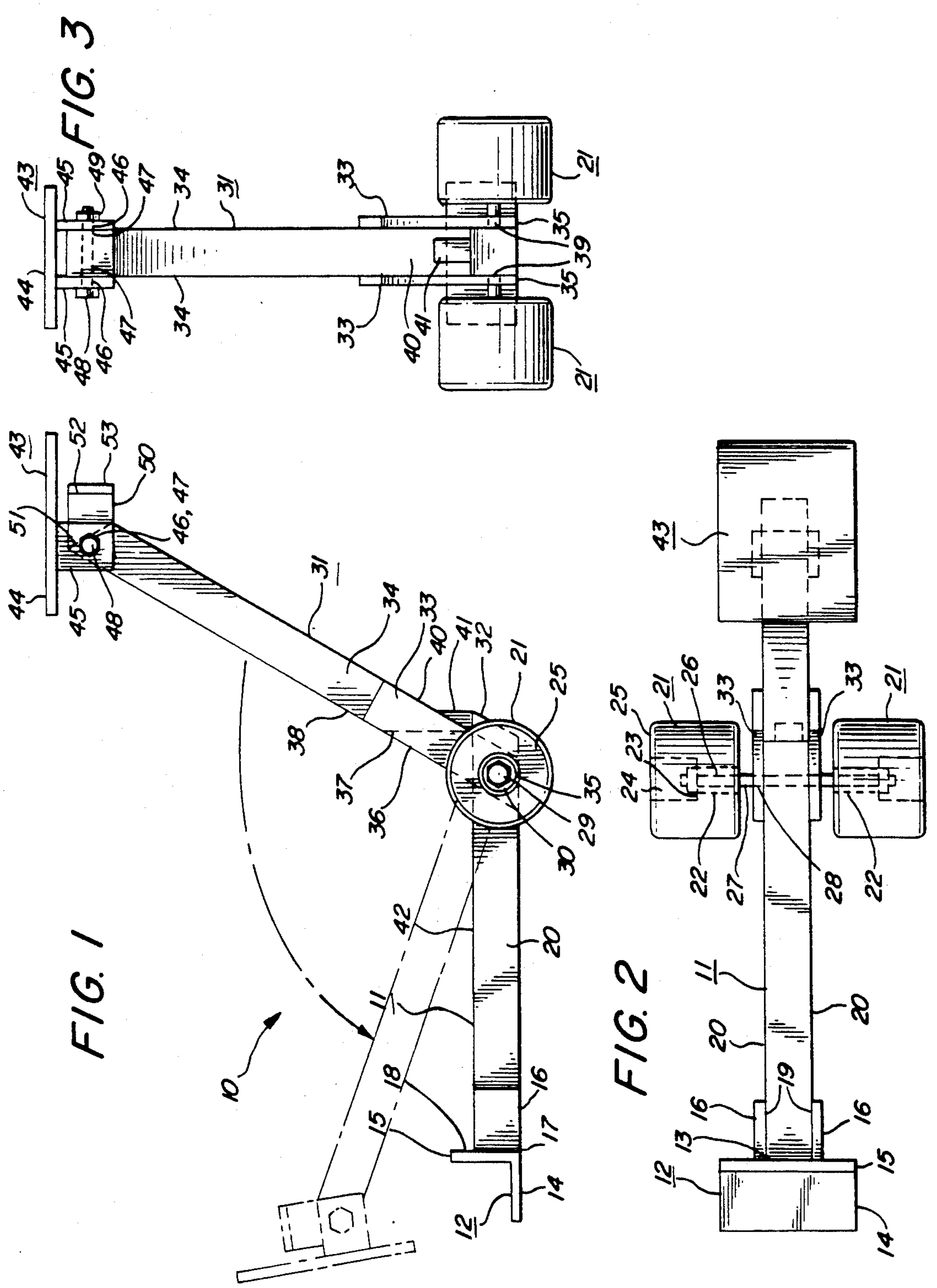
FIG. 1 is a side elevation view of a rollable/foldable sofa jack according to the present invention, showing in phantom a component of the jack folded for storage.
FIG. 2 is an upper plan view of the jack of FIG. 1.
FIG. 3 is a rear elevation view of the jack of FIG. 1.

As shown in FIG. 1, sofa jack 10 includes an elongated straight beam member 11. With jack 10 in position for use, the longitudinal axis of beam member 11 is disposed in a generally horizontal direction and will therefore be referred to henceforth as a horizontal beam member. Horizontal beam member 11 is made of a strong material such as one-inch O.D. square steel tubing made of 1/16 gauge steel.

As may be seen best by referring to FIGS. 1 and 2, an L-shaped flange which functions as a furniture engaging member 12 is attached to a first, front transverse wall 13 of horizontal beam member 11. Flange 12 has a lower horizontally disposed plate section 14, and a vertically disposed rear upright plate section 15 that extends perpendicularly upwards from the rear edge of the horizontal plate section. Preferably, horizontal plate section 14 and upright plate 15 are formed as integral parts of a length of 3/16 inch-thick angle iron.

In the preferred embodiment of jack 10, flange 12 is fastened to horizontal beam member 11 by a pair of rectangular plates 16, one on each side of the horizontal beam member. A front vertical edge wall 17 of each plate 16 is welded to the rear wall surface 18 of rear upright 15 of flange 12. Also, the inner facing side wall 19 of each plate 16 is welded to an adjacent vertical side wall 20 of horizontal beam member 11.

As shown in FIGS. 1, 2 and 3, the rear longitudinal end of horizontal beam member 11 is rollably supported by a pair of generally cylindrically-shaped roller wheels 21. Each wheel 21 has a central coaxial bearing assembly 22, which extends inwards from an annular face 23 which comprises the inner or bottom wall of a coaxial counter bore 24 which extends inwards from the outer circular face 25 of the wheel. Each bearing assembly 22 has a central coaxial through-hole 26 for receiving an axle.

An axle 27 consisting of an elongated threaded rod extends through a pair of aligned threaded holes 28 in opposite vertical side walls 20 of horizontal beam member 11. Each end of axle 27 is secured to a wheel 21 by means of a nut 29 tightened down into a washer 30 slipped over the axle.

Sofa jack 10 also includes an elongated upright beam member 31 which is used to apply a downward force to the rear end of horizontal beam member 11, thereby causing flange 12 to exert an upwardly directed force on an article of furniture, as will be described below.

Referring again to FIGS. 1 through 3, an elongated straight upright beam member 31 is shown fastened to horizontal beam member 11, slightly forward of the rear oblique face 32 of the horizontal beam member. Upright beam member 31 is preferably made of a strong, lightweight material. In the preferred embodiment, upright beam member 31 is made of one-inch O.D. square steel tubing fabricated from 1/16 gauge steel plate. As may be seen best by referring to FIG. 1, the longitudinal axis of upright beam member 31 extends upwardly and rearwardly from horizontal beam member 11.

As may be seen best by referring to FIGS. 1, 2 and 3, the lower end of upright beam member 31 is pivotably fastened to the rear portion of horizontal beam member 11. Preferably, axle 27 serves as the pivot axis between upright beam member 31 and horizontal beam member 11. Thus, as shown in FIG. 1, a pair of elongated rectangular extension plates 33 is fastened to opposite vertical side walls 34 of upright member 31. Each plate 33 has an obliquely disposed lower transverse edge wall 35 which is located longitudinally forward of the lower edge wall 36 of upright beam member 31. Lower transverse edge wall 35 of pivot plate 33 preferably makes an angle of about 30 degrees with respect to the upper longitudinal edge wall 36 of the plate. Lower transverse edge wall 37 of upright beam member 31 preferably makes an angle of about 60 degrees with respect to the upper longitudinal edge wall 38 of the upright member.

Extension plates 33 are pivotably fastened to horizontal beam member 11 by means of axle 27 passing through a pair of aligned through holes 39, one in each extension plate. As may be seen best by referring to FIGS. 1 and 2, rearward and downward (clockwise) pivotal motion of upright beam member 31 relative to horizontal beam member 11 is limited by contact of the lower longitudinal wall 40 of the upright member with a stop plate 41. As may be seen best by referring to FIG. 1, stop plate 41 has a triangular shape. Stop plate 41 is preferably fabricated from ½ inch thick steel plate, and is welded to the upper longitudinal surface 42 of horizontal beam member 11.

As shown in phantom in FIG. 1, upright member 31 may be pivoted forward in a counterclockwise sense with respect to horizontal beam member 11, until lower transverse edge wall 37 of the upright member contacts upper longitudinal surface 42 of horizontal beam member 11. In this folded-forward position, sofa jack 10 has a compact configuration which facilitates storing and transporting the jack.

Sofa jack 10 includes a pedal 43 adapted to transmitting a clockwise torque to upright beam member 31 and horizontal beam member 11. As shown in FIGS. 1 through 3, pedal 43 includes a flat, generally rectangular shaped upper foot plate 44. A pair of spaced apart rectangular flanges or clevis plates 45 protrude perpendicularly downwards from the lower surface of the foot plate. Each flange 45 has an identically positioned through-hole 46. The two through-holes 46 form a hole pair coaxial with a horizontal axis perpendicular to flanges 45.

As may be seen best by referring to FIG. 3, the spacing between the inner facing walls of flanges 45 is of the proper size to insertably receive upright member 31, each flange slidably contacting an adjacent vertical side wall 34 of the upright member. Near the upper end of upright member 31, each side wall 34 of the upright member is provided with an identically positioned through-hole 47. Through-holes 47 form a hole pair coaxial with a horizontal axis perpendicular to vertical side walls 34 of upright member 31.

Flanges 45 of pedal 43 are pivotably fastened to upright member 31 by means of a bolt 48 which passes through registered holes 46 in flanges 45 and through registered holes 47 in side walls 34 of the upright member. Bolt 48 is secured to upright member 31 by means of a nut 49 threaded into the bolt.

As may be seen best by referring to FIG. 1, upright beam member 31 has a short, straight horizontally disposed extension beam member 50 which protrudes rearwards from the upper end of the upright beam member. Extension beam member 50 is preferably fabricated from the same tubular steel stock as upright beam member 31, and is welded thereto at an oblique angle along a miter joint line, as indicated by the numeral 51 in FIG. 1. As may be seen best by referring to FIGS. 1 and 2, the outer opening 52 in tubular extension member 50 is desirably plugged with a square insert plate 53.

Tubular extension 50 functions as a torque arm. Thus, when a downward force is applied to the upper surface of foot plate 44 of pedal 43, the foot plate pivots clockwise until its lower surface forcibly contacts the upper surface of extension 50, thereby transmitting a positive moment to upright member 31 around the axis of axle 27. This positive moment is in turn transmitted to horizontal beam member 11 via contact of the lower longitudinal wall 40 of upright member 31 with the diagonal surface of stop plate 41.

Figure 4:
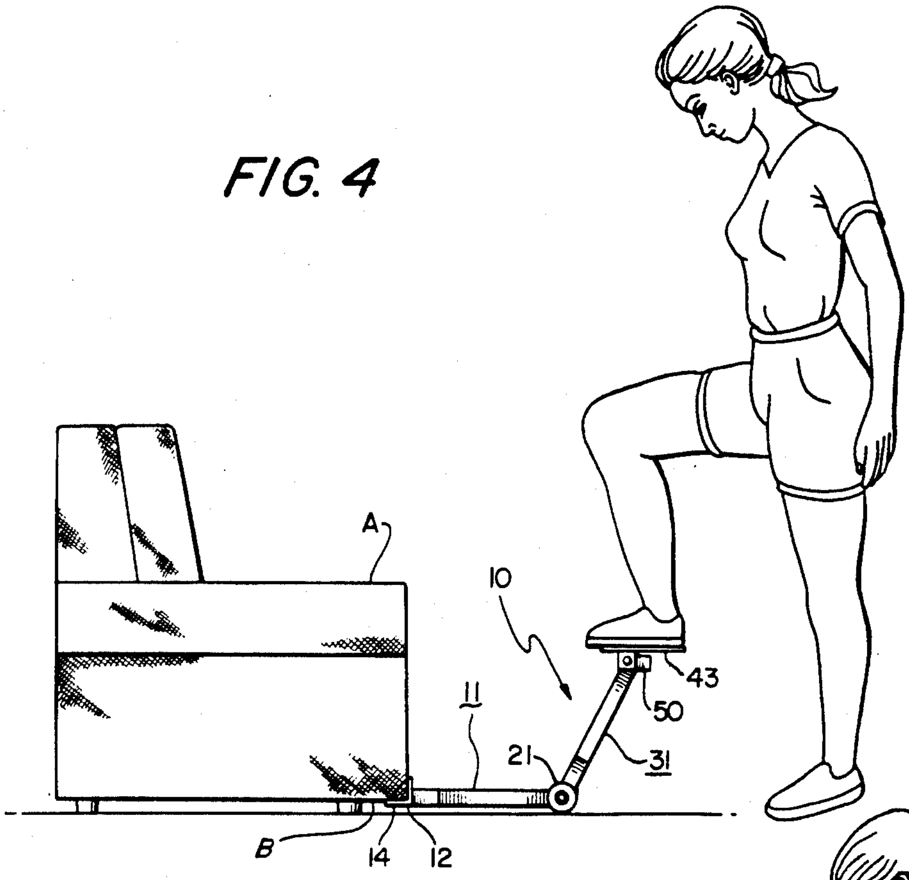
FIG. 4 is a side elevation view showing a component of the jack of FIG. 1 inserted under a sofa.
Figure 5:
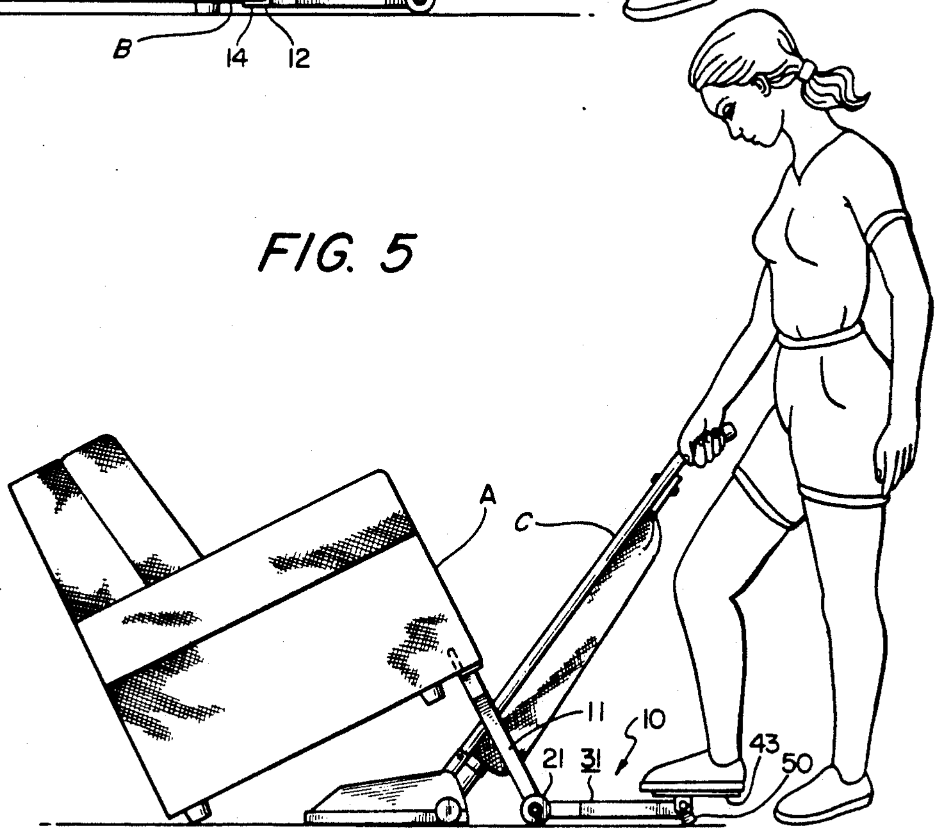
FIG. 5 is a side elevation view similar to FIG. 6, but showing the jack being used to lift the sofa.

The manner of using sofa jack 10 is illustrated in FIGS. 4 and 5.

As shown in FIG. 4, sofa jack 10 is rolled forward towards the edge of a sofa A or other piece of furniture to be lifted. Sofa jack 10 is then moved further forwards until horizontal plate 14 of flange 12 is inserted beneath the front edge of frame or base B of the sofa. Then, a downward force is applied to pedal 43 of jack 10 by the foot of the user. As was described above, a downward force on pedal 43 causes a clockwise torque to be exerted on upright member 31 and horizontal beam member 11. This clockwise torque causes furniture engaging member 12 to exert an upward lifting force on sofa A.

As sofa A ascends and pedal 43 descends, sofa jack 10 rolls forward on wheels 21 towards the sofa, while the pedal pivots counter-clockwise around the axis of bolt 48. Thus, as shown in FIG. 5, the upper surface of pedal 43 remains in horizontal flush contact with the bottom of the user's foot throughout the entire ascent of sofa A. Flush contact between the foot and pedal 43 allows a large lifting force to be comfortably and conveniently applied to sofa A.

As shown in FIG. 5, the length of tubular extension 50 is preferably such as to limit downward movement of upright member 31 to a position in which the upright member 31 and pedal 43 are approximately horizontally disposed.

With sofa A in an elevated position as shown in FIG. 5, the user of sofa jack 10 may maintain the sofa in that position by "standing" on pedal 43 with one foot. Thus, the user has both hands free to operate a vacuum cleaner C in the area underneath sofa A.

What is claimed is:

1. A jack for lifting furniture comprising:

a. an elongated horizontal beam, b. a furniture engaging member attached to said horizontal beam at a first, front transverse end of said horizontal beam, c. roller means attached to said horizontal beam near a second, rear transverse end of said horizontal beam, said roller means being adapted to facilitate roller motion of said horizontal beam along a horizontal surface, d. an elongated upright beam pivotably attached at a first, lower end thereof to a pivot axis transversely disposed through said horizontal beam, near said rear transverse end of said horizontal beam, whereby said upright beam may be pivoted forward in a vertical plane with respect to said horizontal beam to facilitate storage and transportation of said furniture jack, and e. a stop member located rearward of said pivot axis, said stop member be adapted to limit rearward pivotal motion of said upright beam relative to said horizontal beam and to transmit a torque applied to said upright beam to said horizontal beam, whereby said jack may, solely by use of force applied by a person's foot, be rolled into place beneath an article of furniture, said upright beam pivoted clockwise rearward from a lower storage position to an operable upright position, sand a clockwise force applied by the foot to said upright beam, thereby causing said furniture engaging member to exert a lifting force on said article of furniture.

2. The furniture jack of claim 1 wherein said roller means has a horizontally disposed rolling axis.

3. The furniture jack of claim 2 wherein said longitudinal axes of said horizontal beam, said upright beam and said roller means intersect at a common point on said roller means axis.

4. The furniture jack of claim 3 wherein said roller means is further defined as comprising in combination a horizontal axle attached to said horizontal beam near said rear transverse end thereof, said axle being disposed perpendicularly to said longitudinal axis of said horizontal beam, and a pair of wheels rollably attached to said axle, said wheels being located on opposite sides of said horizontal beam.

5. The furniture jack of claim 3 further including a foot pedal attached to the upper transverse end of said upright beam, said foot pedal being adapted to receive a downwardly directed force, thereby transmitting to said upright beam a force having a component normal to said longitudinal axis of said upright member.

6. The furniture jack of claim 5 further including pivotable fastening means which connect said foot pedal to said upright member, said pivotable fastening means being adapted to permit pivotable motion in a vertical plane of said foot pedal relative to said upright member.

7. The furniture jack of claim 3 wherein said furniture engaging member is further defined as being an L-shaped flange having a vertical plate portion attached to said front transverse end of said horizontal beam, and a forward-protruding horizontal plate portion.

8. A furniture jack comprising:

a. an elongated horizontal beam, b. a furniture-engaging member attached to a first, front transverse end of said horizontal beam, c. roller means attached to said horizontal beam near a second, rear transverse end thereof, said roller means comprising a horizontal axle disposed perpendicularly to the longitudinal axis of said horizontal beam, said axle having rollably attached to opposite ends thereof a pair of wheels located on opposite sides of said horizontal beam, d. an elongated upright beam attached to said horizontal beam near said rear end thereof, said upright beam protruding obliquely upwards and rearwards from said horizontal beam, e. pivotable fastening means joining said straight upright beam to said horizontal beam, said pivotable fastening means permitting pivotable movement in a vertical plane of said upright beam relative to said horizontal beam, and f. a stop member located rearward of said pivotable fastening means adapted to limit rearward movement of said upright member relative to said horizontal beam, said stop member being adapted to transmit a torque applied to said upright beam round the pivot axis of said pivotable fastening means to said horizontal beam.

9. The furniture jack of claim 8 wherein said stop member is further defined as being attached to said upright beam.

10. The furniture jack of claim 8 wherein said stop member is further defined as being attached to said horizontal beam.

11. The furniture jack of claim 8 wherein said pivotable fastening means that joins said upright beam to said horizontal beam is further defined as comprising in combination a pair of longitudinally elongated extension plates attached to front and rear sides of said upright member, each of said extension plates having a hole aligned with a corresponding hole in the other of said extension plates, said plates protruding longitudinally forward parallel to the longitudinal axis of said upright member, a space being formed between inner facing walls of said extension plates of the proper size to insertably and slidably receive said horizontal member, said axle being inserted through said holes of said extension plates.

12. A furniture jack comprising:

a. an elongated horizontal beam, b. a furniture-engaging member attached to a first, front transverse end of said horizontal beam, c. roller means attached to said horizontal beam near a second, rear transverse end thereof, said roller means comprising an axle disposed perpendicularly to the longitudinal axis of said horizontal beam, said axle protruding equidistant outwards from opposite left and right side walls of said horizontal beam, and a pair of wheels, one each rollably attached to each opposite end of said axle, d. an elongated upright member, said upright member having a center beam portion and left and right parallel extension members attached to left and right sides, respectively, of said center beam portion, said extension members protruding longitudinally beyond a first, lower end of said center beam portion along said left and right sides of said horizontal beam, the lower end of each of said extension members being provided with a hole through which said axle extends, thereby allowing pivotable motion in a vertical plane of said upright member relative to said horizontal beam, and a. a stop member adapted to limit rearward movement of said upright member relative to said horizontal beam, said stop member being adapted to transmit a torque applied to said upright member around said axle to said horizontal beam.

13. The furniture jack of claim 12 further including a foot pedal attached to a second, upper end of said upright member, said foot pedal having a treadle surface adapted to receive a downward directed force applied by a foot, thereby moving said upright member downward and said front end of said horizontal beam upward.

14. The furniture jack of claim 13 wherein said foot pedal is pivotably attached to said upright member, thereby permitting pivotable motion in a vertical plane of said foot pedal relative to said upright member as said foot pedal is depressed, and thereby maintaining said surface of said foot pedal relatively horizontal.

15. The furniture jack of claim 14 wherein said horizontal beam has a tubular construction having a uniform transverse cross-sectional shape.

16. The furniture jack of claim 15 wherein said beam is further defined as being tubular.

17. The furniture jack of claim 14 wherein said center beam portion of said upright member has a uniform transverse cross-sectional shape.

18. The furniture jack of claim 17 wherein said beam is further defined as begin tubular.

19. The furniture jack of claim 17 wherein said beam is further defined as being an open channel.

20. The furniture jack of claim 15 wherein said furniture engaging member is further defined as being an L-shaped flange having a vertically disposed rear plate fastened to said front end of said horizontal beam, and a horizontally disposed lower plate that protrudes forward from said horizontal beam.

21. The furniture jack of claim 18 further including a horizontally disposed extension beam member that protrudes obliquely rearward from said upper end of said upright member, said extension being of the proper length to contact a horizontal surface on which said furniture jack is placed, thereby limiting downward movement of said upright member to a position in which the longitudinal axis of said upright member is approximately horizontally disposed.

* * * * *